United States Patent
Carparelli

(10) Patent No.: US 11,250,690 B2
(45) Date of Patent: Feb. 15, 2022

(54) SECURITY SYSTEM FOR BUILDINGS WITH ELEVATOR INSTALLATIONS

(71) Applicant: INVENTIO AG, Hergiswil (CH)

(72) Inventor: Donato Carparelli, Lugano (CH)

(73) Assignee: Inventio AG

( * ) Notice: Subject to any disclaimer, the term of this patent is extended or adjusted under 35 U.S.C. 154(b) by 0 days.

(21) Appl. No.: 17/330,352

(22) Filed: May 25, 2021

(65) Prior Publication Data

US 2021/0280049 A1 Sep. 9, 2021

Related U.S. Application Data

(63) Continuation of application No. 16/349,087, filed as application No. PCT/EP2017/078807 on Nov. 9, 2017, now abandoned.

(30) Foreign Application Priority Data

Nov. 11, 2016 (EP) ..................................... 16198318

(51) Int. Cl.
*G08B 25/14* (2006.01)
*H04W 76/10* (2018.01)
(Continued)

(52) U.S. Cl.
CPC .............. *G08B 25/14* (2013.01); *B66B 3/008* (2013.01); *B66B 5/00* (2013.01); *B66B 5/0006* (2013.01); *H04W 76/10* (2018.02)

(58) Field of Classification Search
CPC ......... G08B 25/14; B66B 5/0006; B66B 5/00; B66B 3/008; H04W 76/10
See application file for complete search history.

(56) References Cited

U.S. PATENT DOCUMENTS

| 4,482,032 A | 11/1984 | Enriquez et al. |
| 4,568,909 A | 2/1986 | Whynacht |

(Continued)

FOREIGN PATENT DOCUMENTS

| CN | 102368345 A | 3/2012 |
| EP | 1236075 B1 | 1/2007 |

(Continued)

*Primary Examiner* — Adnan Aziz
(74) *Attorney, Agent, or Firm* — Bressler, Amery and Ross; Pierre R. Yanney

(57) ABSTRACT

A building security system includes an emergency communications system of an elevator installation, and a building alarm system. The emergency communications system has a communications interface to couple the emergency communications system to a remote elevator service central in an emergency situation, and an emergency call panel arranged in an elevator car to allow a passenger to communicate with the remote elevator service central via the communications interface while in the elevator car during the emergency situation. The building alarm system includes a plurality of sensor units arranged at predetermined locations of the building and selected to detect predetermined building events. The building alarm system is communicatively coupled to the emergency communications system of the elevator installation for communicating the building event to the elevator service central via the emergency communications system of the elevator installation, and/or for receiving an action request from the remote elevator service central via the communications interface of the emergency communications system.

13 Claims, 2 Drawing Sheets

(51) Int. Cl.
*B66B 3/00* (2006.01)
*B66B 5/00* (2006.01)

(56) References Cited

U.S. PATENT DOCUMENTS

| | | | |
|---|---|---|---|
| 5,064,026 A | 11/1991 | Nagata et al. | |
| 5,714,726 A | 2/1998 | Ketovita | |
| 6,000,505 A | 12/1999 | Allen | |
| 7,073,633 B2 | 7/2006 | Weinberger et al. | |
| 7,377,364 B2 | 5/2008 | Tyni et al. | |
| 7,398,860 B2 | 7/2008 | Amano | |
| 7,475,122 B2* | 1/2009 | Azpitarte | G05B 19/042 |
| | | | 709/217 |
| 9,350,871 B2 | 5/2016 | Smith et al. | |
| 9,580,276 B2 | 2/2017 | Toutaoui | |
| 9,734,003 B2 | 8/2017 | Sekine et al. | |
| 9,802,789 B2 | 10/2017 | Kim et al. | |
| 2002/0036122 A1 | 3/2002 | Fayette et al. | |
| 2003/0057029 A1 | 5/2003 | Fujino et al. | |
| 2009/0071762 A1 | 3/2009 | Amano | |
| 2009/0204265 A1 | 8/2009 | Hackett | |
| 2011/0100762 A1 | 5/2011 | Gerstenkorn et al. | |
| 2012/0051449 A1 | 5/2012 | Bunter et al. | |
| 2012/0168262 A1 | 7/2012 | Finschi | |
| 2013/0001022 A1* | 1/2013 | Marien | B66B 5/0093 |
| | | | 187/390 |
| 2017/0103491 A1 | 4/2017 | Bora | |
| 2018/0179022 A1 | 6/2018 | Huber et al. | |

FOREIGN PATENT DOCUMENTS

| | | | | |
|---|---|---|---|---|
| JP | S6333488 A | 2/1988 | | |
| JP | H031298 B2 * | 1/1991 | | C07C 253/10 |
| JP | H043787 A | 1/1992 | | |
| JP | H0437386 A | 2/1992 | | |
| JP | H0627192 A | 2/1994 | | |
| JP | H0627192 Y2 | 7/1994 | | |

* cited by examiner

SECURITY SYSTEM FOR BUILDINGS WITH ELEVATOR INSTALLATIONS

CROSS-REFERENCE TO RELATED APPLICATIONS

This application is a continuation of pending U.S. patent application Ser. No. 16/349,087 filed on May 10, 2019, claiming the benefit of priority based on International Patent Application No. PCT/EP2017/078807, filed on Nov. 9, 2017, which claims the benefit of priority based on European Patent Application No. 16198318.4, filed on Nov. 11, 2016. The contents of all of these patents and applications are incorporated herein by reference in their entirety.

FIELD OF THE INVENTION

The present disclosure of various embodiments generally relates to security systems. More particularly, the various embodiments described herein relate to security systems for buildings with elevator installations and a method of operating such security systems.

BACKGROUND OF THE INVENTION

Residential or commercial multi-story buildings are usually equipped with at least one elevator installation that provides for vertical transportation of passengers or objects. Certain codes and standards, e.g., EN 81-28, require that the elevator installation is equipped with an emergency call system (also referred to as a telealarm system) to enable, e.g., an entrapped passenger to contact a remote service call center at any time for assistance. Such a system includes an alarm call panel (e.g., having a microphone and a loudspeaker) installed in an elevator car and a communications module (e.g., a telephone apparatus) for enabling communications with the remote service call center. Independent therefrom, owners or operators of these buildings may choose to install a security system to protect building occupants and/or property. For example, a building owner may contract with a security service company to install and monitor sensors that detect fire, gas, water, or unauthorized entry, as well as to enable remote operation of building parts, e.g., actuators of doors or gates.

Although these technologies satisfy certain security requirements, building owners may have additional requirements, e.g., regarding flexibility, convenience, reliability, technical implementation, and cost. There is, therefore, a need for an improved technology that satisfies these requirements.

SUMMARY OF THE INVENTION

Accordingly, one aspect of such an improved technology involves a building security system having an emergency communications system of an elevator installation, and a building alarm system. The emergency communications system includes a communications interface to communicatively couple the emergency communications system to a remote elevator service central, and an emergency call panel arranged in an elevator car to allow a passenger to communicate with the remote elevator service central via the communications interface while in the elevator car during the emergency situation. The building alarm system includes a plurality of sensor units to be arranged at predetermined locations of the building and selected to detect predetermined building events. The building alarm system is coupled to the communications interface of the elevator installation for communicating the building event to the elevator service central, and/or for receiving an action request from the remote elevator service central via the communications interface of the emergency communications system.

Another aspect of the improved technology involves a method of operating a building security system having a building alarm system and an emergency communications system of an elevator installation. The emergency communications system includes a communications interface to couple the emergency communications system to a remote elevator service central, and an emergency call panel arranged in an elevator car to allow a passenger to communicate with the remote elevator service central via the communications interface while in the elevator car during the emergency situation. The building alarm system includes a plurality of sensor units arranged at predetermined locations of the building and selected to detect predetermined building events. In such a building security system, a building event is communicated from the building alarm system via the communications interface of the emergency communications system to the remote elevator service central, and/or an action request is communicated from the remote elevator service central via the communications interface of the emergency communications system to the building alarm system.

The technology described herein provides for at least a double-use of an emergency call system of an elevator installation. That is, the emergency call system required by certain codes and standards to be provided in elevator installations is not only used for elevator-specific emergency calls to a remote elevator service central, but additionally for reporting building events to the elevator service central. From there, other alarm response services, such as a local police and/or fire department may be notified, either by automatically forwarding a building event or by having service personnel report the building event to a suitable alarm response service. As the elevator service central is staffed 24 hours a day, and 7 days a week (24/7), as may be required by codes and standards, no additional alarm service provider is needed. For convenience and/or cost reasons, building operators or building owners may prefer dealing with as low a number of service providers as possible.

Moreover, such a multiple-use of the elevator installation's emergency call system simplifies the installation of the building alarm system because the elevator shaft can be used as a vertical conduit. The shaft allows running wires and cables from the basement to the top floor essentially without, or hardly any restrictions. In horizontal direction, e.g., on each floor, cables can be fed to the shaft and connected to vertically running cables. This avoids drilling holes through floors and ceilings, or providing a separate vertical conduit for the building alarm system. Through these measures, overall installation time and cost may be reduced.

In certain embodiments, using the elevator installation's emergency call system allows implementing additional features that benefit in particular the occupants (owners or tenants), e.g., of apartments or offices in the building. For example, the improved technology allows an apartment occupant to receive 24/7 security-related information while away from the apartment (e.g., while travelling). Also, the occupant may wish to monitor the status of various sensors or activate actuators installed at the building, e.g., from a remote location. For these features, the occupant may use a software application ("App") running on a portable electronic device (e.g., a smartphone) that communicates with the elevator service central. The elevator service central then obtains the requested information from the building alarm system via the emergency communications system. These features are made available in addition to the support and assistance features provided by the remote elevator service central and its personnel in case of need.

The multiple-use of the elevator installation's emergency call system is also beneficial when a building owner decides to upgrade or modernize the building with a building alarm system, e.g., to provide for additional security of the building occupants. During such an upgrade project, cables can be installed in the existing elevator shaft, as mentioned above. Furthermore, the security system according the technology described herein allows using wireless sensor units that can be installed at desired locations without having to install cables. The RF transceivers that receive the event signals from the sensor units may be installed at convenient locations and coupled, e.g., to the vertically running cables in the elevator shaft.

In one embodiment, the RF transceivers may be comprised in floor terminals that further include floor call terminals of the elevator installation. This allows running the cables that may be needed to couple the RF transceivers to the alarm processing unit together, e.g., in the same conduit, with those needed to couple the floor call terminals to the elevator controller. This simplifies the installation, e.g., with respect to time and cost, and may be an advantage if design aspects need to be considered, e.g., one design aspect may require that the RF transceivers are not visible.

In one embodiment, the improved technology provides for bi-directional communication. An event signal is received from the building alarm system by the emergency communications system of the elevator installation. The event signal is indicative of a building event detected by a sensor unit. A communications link between the emergency communications system and the elevator service central is established by the emergency communications system. The event signal is transmitted by the emergency communications system to the elevator service central. If an action request is to be transmitted in opposite direction, the elevator service central establishes a communications link between the elevator service central and the emergency communications system. The emergency communications system of the elevator installation receives the action request from the elevator service central, and transmits the action request to the building alarm system.

As to the kind of action request, the technology provides for flexibility. For example, the action request includes in one embodiment one of a status request and an activation signal. The status request relates to a current status of at least one of the sensor units, and the activation signal relates to an actuator arranged at the building. The current status of a sensor unit may indicate that the sensor unit is working properly, and/or that no building event has been detected. Depending on a particular embodiment, the occupant may request the status of a particular sensor unit, e.g., using the portable electronic device and the app. The activation signal identifies a particular actuator and a desired action, e.g., unlocking a door. This action may also be selected using the app.

The improved technology provides flexibility regarding the kind of communications link used between the emergency communications system and the elevator service central. That is, the link can be established by setting up a radio communications link via a mobile communications network, or by setting up a call via a telephone network.

In one embodiment, the event signal is transmitted in a data channel. This avoids that transmission of the event signal may be delayed or disturbed through a concurrently occurring (voice) emergency call.

BRIEF DESCRIPTION OF THE DRAWINGS

The novel features and method steps characteristic of the technology are set out in the claims below. The various embodiments of the technology, however, as well as other features and advantages thereof, are best understood by reference to the detailed description, which follows, when read in conjunction with the accompanying drawings, wherein:

DETAILED DESCRIPTION OF EMBODIMENTS OF THE INVENTION

Figure 1:
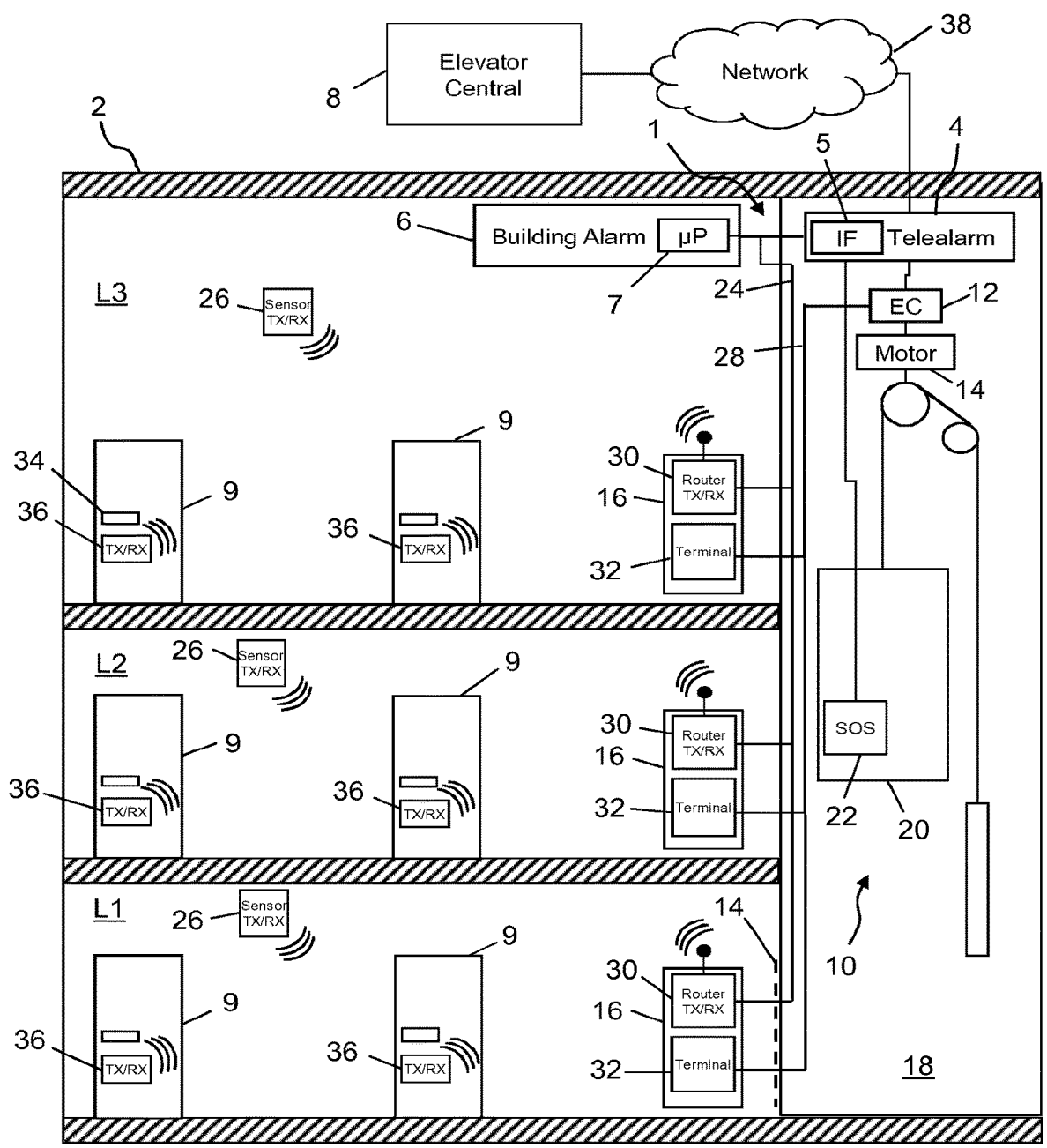
FIG. 1 shows a schematic illustration of an exemplary building equipped with one embodiment of a security system.

FIG. 1 is a schematic illustration of one embodiment of a building security system 1 in a building 2, in particular a multi-story building. The building 2 may be an apartment building, an office building, a commercial/shopping center, a hotel, a sports arena, an airport terminal, a ship, or any other structure suitable for a person to reside or stay for a longer period of time. The exemplary building 2 shown in FIG. 1 is used herein to describe various embodiments of the technology; it is contemplated, however, that other structures may have a different layout. The illustrated part of the building 2 has several floors L1, L2, L3, each one providing access to dedicated areas or zones (e.g., offices or apartments) and an elevator car 20 of an elevator installation 10. That is, a passenger can board the elevator car 20 on one of these floors L1, L2, L3 (sometimes referred to as a boarding floor), and, after having been transported to another one of these floors L1, L2, L3 (sometimes referred to as a destination floor), exit the elevator car 10 at the destination floor. From there, the passenger may enter an office or an apartment, or exit the building 2 via an apartment/office door 9 or a building door 9, respectively.

The security system 1 includes a building alarm system 6 and an emergency communications system 4 of the elevator installation 10. Briefly, in that security system 1, a building event is communicated from the building alarm system 6 via a communications interface 5 of the emergency communications system 4 to a remote elevator service central 8. In addition, or in the alternative, an action request is communicated from the remote elevator service central 8 via the communications interface 5 of the emergency communications system 4 to the building alarm system 6. The action request may be triggered by an occupant of the building while being away, or by the elevator service central 8 as part of a monitoring routine. The emergency communications system 4 has at least a double function, since it is not only used for elevator-specific emergency calls to the remote elevator service central 8, but additionally for reporting building events to the elevator service central 8. In certain embodiments, additional functions may be provided, such as enabling communications between the elevator service central 8 and the building alarm system 6.

Focusing initially on the building's elevator installation 10, FIG. 1 shows components of the elevator installation 10 to the extent believed to be helpful for a complete understanding of the technology described herein. An elevator controller 12 (EC) is coupled to a drive system 14 (Motor), which is configured to move the elevator car 20 by means of one or more suspension members up and down a shaft 18. As an alternative to such a traction elevator, in another embodiment, the elevator installation 10 may be a hydraulic elevator. The elevator controller 12 includes in one embodiment a call control unit, which processes calls received from floor call terminals 32, a car terminal, or both. The call processing depends on the control scheme (e.g., a conventional up/down control system or a destination call control system), and includes, for example, determining the floor L1, L2, L3 where the elevator car 20 is needed, determining the destination floor L1, L2, L3, allocating the call to the elevator car 20, and acknowledging the call. Based on that call processing, the elevator controller 12 controls the drive system 14 to move the elevator car 20 to the boarding floor L1, L2, L3, and then to the destination floor L1, L2, L3. Depending on a particular embodiment, the functionality of the call control unit may be implemented separate from the elevator controller 12, e.g., in a separate control unit coupled to the elevator controller 12.

In that elevator installation 10, the emergency communications system 4 (Telealarm) is coupled to an emergency call panel 22 (SOS) arranged within the elevator car 20. It is contemplated that the emergency communications system 4 encompasses in certain embodiments the emergency call panel 22. The emergency communications system 4 is also referred to as a telealarm system. The emergency call panel 22, which may include a microphone, a loudspeaker and associated electronic circuitries, may be integrated in a car operating panel. Depending on the call control scheme used, the car operating panel may or may not provide for entry of a car call from within the elevator car 20. The emergency communications system 4 is further coupled to an elevator service center 8 (e.g., via a communications network 38), and the building alarm system 6. The elevator service center 8 is in one embodiment located at a remote location, and may be operated by a company that installed the elevator installation 10, or any other service provider.

The building alarm system 6 includes a plurality of sensor units 26, 36 arranged at predetermined locations of the building 2 (e.g., inside the building 2 and/or within a predetermined area outside the building 2) and selected to detect predetermined building events. In one embodiment, a sensor unit 26, 36 generates and outputs an event signal upon detecting a building event. The event signal may be digital signal having a predetermined voltage, e.g., about 5 volts, which corresponds to a logical "1". For example, an output voltage of a sensor unit 26, 36 may change from a voltage of about 0 volt, which corresponds to a logical "0" and indicates the absence of a building event, to about 5 volts if a building event is detected. In another embodiment, the event signal may include a predetermined sequence of voltage changes, e.g., representing a digital code. In another embodiment, the event signal may be an analog signal.

In one embodiment, the building alarm system 6 includes an alarm processing unit 7 (μP), which may be arranged at a central location within the building 2, e.g., as a stand-alone device, or in connection with a building management and control system. As illustrated in FIG. 1, one type of sensor unit 26 is installed in a hallway of each floor L1, L2, L3, and may include a sensor for detecting a certain building event, such as fire, smoke, gas, movement, or water. It is contemplated that the sensor unit 26 may be installed at other locations as well. Sensors for these purposes, such as smoke detectors, heat detectors, humidity sensors, and infrared (IR) detectors are generally known in the art.

Another type of sensor unit 36 may include a sensor for detecting other building events, such as unauthorized entry, or failure of a mechanical or electrical building component. Sensors for these purposes may detect, for example, interruption of a light barrier, vibration, closing or opening of a contact of a switch, and apply heat detectors, infrared (IR) detectors, vibration sensors, and current or voltage sensors, which are generally known in the art. The sensor unit 36 may be installed at the doors 9 (e.g., apartment doors, office doors, or building doors), windows of the building 2, or at any other location that is to be monitored. Selecting these locations is known to one of ordinary skill in the art, and may, for example, depend on the structure and purpose of the building 2. Accordingly, this kind of sensor may be light barrier (e.g., at an entrance or door), a contact switch (e.g., at a window or door), or a vibration sensor (e.g., at the glass of a window or door), which are generally known in the art. It is contemplated that the sensor units 26, 36 may include more than one sensor to detect more than one building event.

Further, it is contemplated that in one embodiment a sensor unit 26, 36 includes, or is coupled to an actuator 34, and is configured for a bi-directional communication, e.g., to receive and respond to an activation signal as one example of an action request. In the embodiment of FIG. 1, the actuator 34 is installed at a door 9 to activate a door locking mechanism in response to a received activation signal. The activation signal may be triggered by a software application (app) running on a portable electronic device of a building occupant, e.g., while being away from the building 2, the occupant may want to unlock the door 9 for an authorized person, or to lock the door 9. For example, the actuator 34 may include an electromagnetic relay, or a solid state relay. When an electromagnetic relay is activated, e.g., when an electric current passes through its coil, it releases a bolt to unlock the locking mechanism so that the door 9 can be opened.

Depending on a particular embodiment, a sensor unit 26, 36 may be configured for a bi-directional communication, e.g., to receive and respond to a status request, which is another example of an action request. The status request may be triggered by the software application upon selection by the occupant, or by a monitoring routine implemented in or being executed in connection with the elevator service central. The status request obtains the current status of a sensor unit 26, 36; its current status may indicate that the sensor unit 26, 36 is working properly, and/or that no building event has been detected.

The sensor units 26, 36 are coupled to the alarm processing unit 7 to communicate event signals that may be indicative of a building event to the alarm processing unit 7. For that purpose, in one embodiment, each sensor unit 26, 36 is connected via a communications line to the alarm processing unit 7. The communications line may be based on individual wires that establish point-to-point connections between the sensor units 26, 36 and the alarm processing unit 7, or a communications bus structure, wherein the sensor units 26, 36 and the alarm processing unit 7 are coupled to the communications bus. In the alternative, as shown in the embodiment of FIG. 1, the sensor units 26, 36 are configured for wireless communications with the alarm processing unit 7. Each sensor unit 26, 36 includes a radio frequency (RF) module that transmits RF signals according to a certain RF communications technology, such as WiFi/WLAN. To receive these RF signals, FIG. 1 shows RF transceivers 30 (Router TX/RX) installed on each floor L1, L2, L3 and coupled to the alarm processing unit 7 via a communications line 24. The communications line 24 may be based on individual wires that establish point-to-point connections between the RF transceivers 30 and the alarm processing unit 7, or a communications bus structure, wherein the RF transceivers 30 and the alarm processing unit 7 are coupled to the communications bus. The RF transceivers 30 may be identified by the alarm processing unit 7 through its address if a bus structure is used, or through a port at which the RF transceiver 30 is connected to the alarm processing unit 7.

Although FIG. 1 shows one RF transceiver 30 for each floor L1, L2, L3, it is contemplated that two or more RF transceivers 30 may be installed on a floor L1, L2, L3. The number of RF transceivers 30 may depend on parameters such as the layout or size of the floor L1, L2, L3, the maximum distance between the RF transceiver 30 and the sensor units 26, 36, and the used RF technology. In consideration of one or more of these parameters, each location for the RF transceiver 30 is selected to ensure reliable RF communications.

In the embodiment shown in FIG. 1, the RF transceiver 30 is part of a floor terminal 16 that also houses the floor call terminal 32 of the elevator installation 10. Alternatively, each RF transceiver 30 may be a stand-alone device mounted at a location on the floor L1, L2, L3 independent of the floor call terminal 32. In each floor terminal 16 of the illustrated embodiment, the floor call terminal 32 is coupled via an elevator control network 28 to the elevator controller 12, and the RF transceiver 30 is coupled to the alarm processing unit 7 via the communications line 24. The floor terminal 16 may have a column-like structure for mounting on the floor at a convenient location for elevator passengers. Alternatively, the floor terminal 16 may be mounted to a building wall, or integrated into an elevator door frame. Regardless of the particular arrangement of the floor terminal 16, at least a part of the elevator control network 28 and the communications line 24 extends in vertical direction within the elevator shaft 18. Since the elevator shaft 18 is used as a vertical conduit, this facilitates installation of the building alarm system 6, e.g., when the building alarm system 6 is installed after the building 2 has been erected, as mentioned elsewhere in this description.

It is contemplated that the building alarm system 6 recognizes the sensor unit 26, 36 that detects a building event. In one embodiment, each sensor unit 26, 36 stores a sensor identifier, and the alarm processing unit 40 maintains a database storing for each sensor unit 26, 36 a data sets. Each data set stores the sensor unit's identifier together with information about where it is located within the building 2, and the type of sensor. If the sensor unit 26, 36 detects a building event, it transmits the sensor identifier together with the event signal to the RF transceiver 30. In one embodiment, the RF transceiver 30 forwards the event signal and the sensor identifier to the alarm processing unit 7. The alarm processing unit 7 may then identify the sensor unit 26, 36 and/or its location, and the RF transceiver 30. In other embodiments, instead of maintaining the database in the alarm processing unit 40, the database may be maintained at the elevator service central 8, which then performs the identification of the sensor unit 26, 36, and its location (e.g., the building location and its location within the building 2).

To provide for the bi-directional communication, the sensor units 26, 36 may in one embodiment be equipped with a signal transmitter and a signal receiver, which may be arranged in a transceiver module. Each sensor unit 26, 36 may be distinguishable from other sensor units 26, 36, e.g., by having a unique address within the building 2. This allows, e.g., addressing a particular sensor unit 26, 36 when communicating an action request, or allocating a response from a sensor unit 26, 36 to a particular sensor unit 26, 36. Further, the sensor units 26, 36 may operate according to a predetermined communications protocol used within the security system 1.

Figure 2:
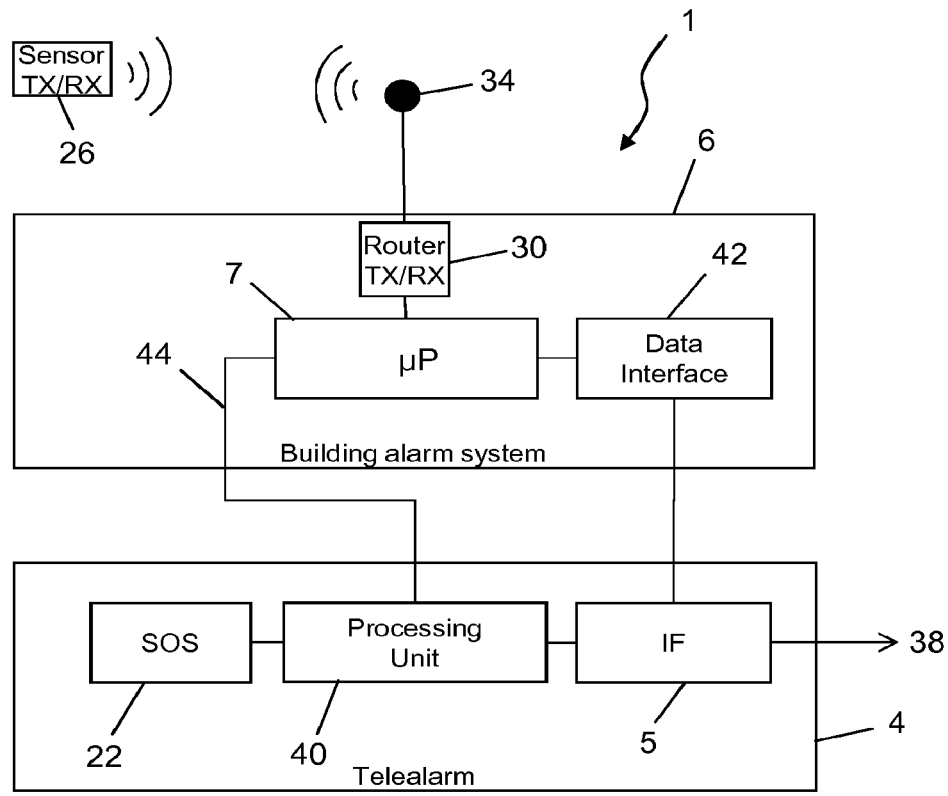
FIG. 2 shows a schematic illustration of the security system of FIG. 1.

FIG. 2 shows a schematic illustration of the security system 1 of FIG. 1 to illustrate one embodiment of data exchange between the building alarm system 6 and the emergency communications system 4 of the elevator installation 10. In the illustrated embodiment, the building alarm system 6 includes a data interface 42 coupled to the alarm processing unit 7 and to the communications interface 5 of the emergency communications system 4, and the emergency communications system 4 includes a processing unit 40 interconnected between the emergency call panel 22 of the elevator car 20 and the communications interface 5. The processing unit 40 is further coupled to the alarm processing unit 7 via a line 44, e.g., to receive a control signal that indicates that an event signal needs to be transmitted by the emergency communications system 4. In the alternative, the data interface 42 may be coupled to the processing unit 40, which recognizes the need for transmission of an event signal as soon as it is output from the data interface 42. It is contemplated that FIG. 2 shows the data interface 42 and the communications interface 5 as separate units for illustrative purposes; in other embodiments the interfaces (5, 42) may be encompassed by the processing units (7, 40).

Regarding its operation with respect to its function in the elevator installation 10, the emergency communications system 4 operates as is known in the art. For example, in the event of an emergency due to a malfunction of the elevator installation 10 (e.g., a passenger is entrapped), the passenger may press an SOS button of the emergency call panel 22. In response, the processing unit 40 establishes, for example, bi-directional voice communication between the emergency call panel 22 and the remote elevator service central 8. In one embodiment, the processing unit 40 initiates dialing a preset phone number and calling the elevator service central 8. During that process, a building identifier is transmitted to the elevator service central 8 that indicates the origin of the call. The building identifier may by a telephone number assigned to the emergency communications system 4 (e.g., using a caller ID function), or any other suitable alphanumeric code. In a record maintained at the elevator service central 8 the building identifier is associated, e.g., with the location of the building 2 and details regarding the elevator installation 10. With the building identifier received during call setup, the location of the emergency can be determined. Once the communication is established, personnel at the elevator service central 8 may communicate with the passenger.

Depending on the transmission and communications technologies applied in the network 38, the communication may, for example, take place over a public switched telephone network (PSTN), the internet (e.g., as voice-over-internet (VoIP) telephony), or a mobile communications network (e.g., according to a standard for UMTS or LTE networks). If one of these technologies, e.g., a mobile communications network, provides for a data channel for data transmissions and a voice channel for voice transmissions, the conversation between the personnel at the elevator service central 8 and the passenger may be transmitted over the voice channel. It is contemplated that the communications interface 5 is configured according to the transmission and communications technologies applied in the network 38.

In one embodiment, the security system 1 provides for communicating an action request from the remote elevator service central 8 via the communications interface 5 of the emergency communications system 4 to the building alarm system 6. For that purpose, the remote elevator service central 8 establishes, for example, bi-directional data communication between the elevator service central 8 and the communications interface 5. Establishing that communication may include activating a modem to contact the emergency communications system 4. In response, the processing unit 40 causes in one embodiment the communications interface 5 to route any data from the elevator service central 8 to the data interface 42 of the building alarm system 6. The data may represent an action request. Once the communication is established, the building alarm system 6 communicates with the elevator service central 8.

Figure 3:
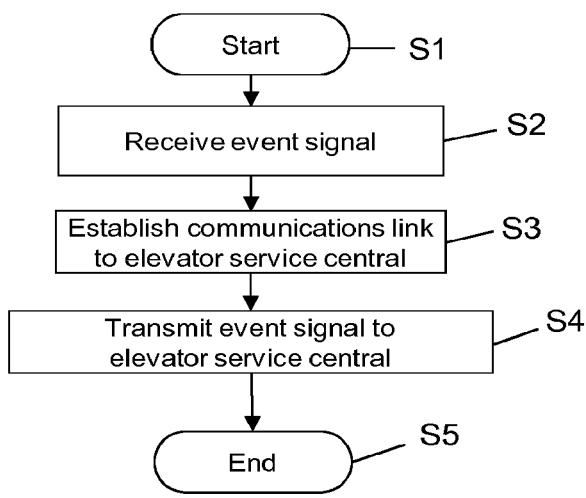
FIG. 3 is a flow diagram of one embodiment of a method of operating the security system of FIG. 1.

With the understanding of the general structure and function of the building security system 1 and certain features of its components described with reference to FIG. 1 and FIG. 2, a description of how one embodiment of the security system 1 operates follows with reference to FIG. 3. FIG. 3 shows a flow diagram of one embodiment of a method of operating the security system 1. It is contemplated that in another illustration of the flow diagram some of the shown steps may be merged into a single step, or split into several separate steps. The flow diagram starts at a step S1 and ends at a step S5.

In a step S2, the emergency communications system 4 of the elevator installation 10 receives an event signal from the building alarm system 6. The event signal indicates a building event detected by a sensor unit 26, 36. The sensor unit 26, 36 transmits the event signal to the (e.g., closest) RF transceiver 30 which forwards the event signal to the alarm processing unit 7. Depending on a particular embodiment, the alarm processing unit 7 may analyze the event signal to determine the kind of building event (e.g., fire or unauthorized access), e.g., based on the type of sensor that generated the event signal, or the location of the sensor unit 26, 36. The alarm processing unit 7 outputs the event signal to the data interface 42. Prior to transmitting the event signal to the emergency communications system 4, the data interface 42 may conform the event signal to a predetermined signal format that corresponds to the format used by the communications interface 5. In one embodiment, the alarm processing unit 7 may generate and send a control signal over the line 44 to the processing unit 40 to indicate the need for transmission of the event signal.

Proceeding to a step S3, the emergency communications system 4 establishes a communications link to the elevator service central 8. Triggered by the control signal received over the line 44, or by the event signal received from the data interface 42, the emergency communications system 4 establishment of the communications, as described above, e.g., by calling the preset telephone number of the elevator service central 8. The communications link is set up via the communications network 38.

Proceeding to a step S4, the emergency communications system 4 transmits the emergency signal over the established communications link. In one embodiment, the communications interface 5 conforms the event signal according to the transmission technology used for communications with the elevator service central 8. For example, for transmission over a wire-bound network 38, the communications interface 5 may conform the signal's voltage level to a defined voltage level and transmit the event signal at a defined transmission rate according to a set transmission protocol. Correspondingly, for transmission over a wireless mobile communications network 38, the communications interface 5 converts the event signal to an RF event signal and transmits it according to a defined transmission protocol (e.g., one for UMTS). In one embodiment, the RF event signal may be transmitted in a data channel of the mobile communications system.

In certain situations, an emergency call from the elevator car 22 may coincide with a building event. In one embodiment, the emergency communications system 4 handles the emergency call and the event signal in the sequence of occurrence. Alternatively, a hierarchy may be defined, e.g., transmission of the event signal has priority over the emergency call. In another embodiment, once the communications link is established, the event signal may be transmitted over a data channel and the emergency call may be conducted over a voice channel. In a further embodiment, transmission of the event signal may be interweaved with the emergency call. Since the transmission of the event signal requires only a short time, the event signal may be transmitted, e.g., while an emergency call is already ongoing. The processing unit 40 may be programmed to operate according to one of these embodiments. These embodiments ensure that both the building event and the emergency call are handled reliable and essentially in real time.

The method illustrated in and described with reference to FIG. 3 may be modified in that it provides for communication of an action request from the elevator service central 8 via the communications interface 5 of the emergency communications system 4 to the building alarm system 6. In such a modified method, communicating the action request includes establishing, by the elevator service central 8, a communications link between the elevator service central 8 and the emergency communications system. Upon receipt of the action request by the emergency communications system 4 of the elevator installation 10, the emergency communications system 4 transmits the action request to the building alarm system 6. Depending on a particular embodiment, the action request includes one of a status request and an activation signal, wherein the status request relates to a current status of at least one of the sensor units 26, 36, and wherein the activation signal relates to an actuator 34 arranged at the building 2, e.g., at a door 9. For example, in response to the status request, at least one sensor unit 26, 36 is polled to transmit its current status. Alternatively, each sensor unit 26, 36 is configured to transmit its status at regular intervals (without having been polled), and the alarm processing unit 40 is configured to store the current status, e.g., together with a time stamp. Upon request, the current status is transmitted as a building event from the building alarm system 6 via the communications interface 5 of the emergency communications system 4 to the remote elevator service central 8.

What is claimed is:

1. A method of operating a building security system comprising a building alarm system and an emergency communications system of an elevator installation, wherein the emergency communications system of the elevator installation includes a communications interface to couple the emergency communications system to a remote elevator service central, and an emergency call panel arranged in an elevator car to allow a passenger to communicate with the remote elevator service central via the communications interface while in the elevator car during an emergency situation, and wherein the building alarm system includes a plurality of sensor units arranged at predetermined locations of the building and selected to detect predetermined building events, comprising:

receiving, by the emergency communications system of the elevator installation, an event signal from the building alarm system, the event signal representing a predetermined value if a sensor unit detects a building event;

establishing, by the emergency communications system of the elevator installation, a communications link between the emergency communications system and the remote elevator service central;

communicating an indication of the building event via the communications interface of the emergency communications system to the remote elevator service central; and communicating an action request from the remote elevator service central via the communications interface of the emergency communications system to the building alarm system.

2. The method of claim 1, wherein the event signal is associated with an identifier of the building.

3. The method of claim 1, wherein the event signal is transmitted in a data channel.

4. The method of claim 1, wherein communicating the action request comprises:

establishing, by the remote elevator service central, a communications link between the remote elevator service central and the emergency communications system;

receiving, by the emergency communications system of the elevator installation, the action request from the remote elevator service central; and transmitting, by the emergency communications system, the action request to the building alarm system.

5. The method of claim 4, wherein the action request includes a status request or an activation signal, wherein the status request relates to a current status of at least one of the sensor units, and wherein the activation signal relates to an actuator arranged at the building.

6. The method of claim 5, further comprising:

in response to the status request, obtaining the current status of the at least one of the sensor units, and communicating the current status as a building event from the building alarm system via the communications interface of the emergency communications system to the remote elevator service central.

7. The method of claim 1, wherein establishing the communications link includes setting up a radio communications link via a mobile communications network.

8. The method of claim 1, wherein establishing the communications link includes setting up a call via a telephone network.

9. A building security system, comprising:

an emergency communications system of an elevator installation, the emergency communications system having a communications interface to couple the emergency communications system to a remote elevator service central in an emergency situation, and an emergency call panel arranged in an elevator car to allow a passenger to communicate with the remote elevator service central via the communications interface while in the elevator car during the emergency situation; and a building alarm system including a plurality of sensor units arranged at predetermined locations of the building and selected to detect predetermined building events, wherein the building alarm system is communicatively coupled to the emergency communications system of the elevator installation for communicating an indication of the building event to the emergency communications system of the elevator installation, the emergency communications system of the elevator installation establishing a communications link with the remote elevator service control and communicating the indication of the building event via the communications interface of the emergency communications system to the remote elevator service control and for receiving an action request from the remote elevator service central and communicating the action request via the communications interface of the emergency communications system to the building alarm system.

10. The system of claim 9, wherein the plurality of sensor units include at least one sensor for fire, smoke, gas, water, unauthorized entry, or mechanical or electrical equipment failure.

11. The system of claim 9, wherein the building alarm system includes an alarm processing unit, wherein the alarm processing unit is arranged separate from the emergency communications system and coupled to the communications interface.

12. The system of claim 9, wherein the building alarm system includes an alarm processing unit, wherein the alarm processing unit is integrated into the emergency communications system and coupled to the communications interface.

13. The system of claim 9, wherein at least one of said plurality of sensor units includes a radio-frequency module for transmitting a sensor signal, and wherein the building alarm system further includes a radio-frequency transceiver to receive the sensor signal.

* * * * *